United States Patent [19]

Okin

[11] Patent Number: 5,361,337
[45] Date of Patent: Nov. 1, 1994

[54] METHOD AND APPARATUS FOR RAPIDLY SWITCHING PROCESSES IN A COMPUTER SYSTEM

[75] Inventor: Kenneth Okin, Saratoga, Calif.

[73] Assignee: Sun Microsystems, Inc., Mountain View, Calif.

[21] Appl. No.: 883,059

[22] Filed: May 8, 1992

Related U.S. Application Data

[63] Continuation of Ser. No. 389,570, Aug. 3, 1989.

[51] Int. Cl.$^5$ .............................................. G06F 9/38
[52] U.S. Cl. .................................. 395/375; 395/425
[58] Field of Search ................ 395/375, 425; 364/200, 364/900

[56] References Cited

U.S. PATENT DOCUMENTS

| | | | |
|---|---|---|---|
| 3,373,408 | 3/1968 | Ling | 364/200 |
| 3,728,692 | 4/1973 | Fennel, Jr. | 364/200 |
| 4,229,790 | 10/1980 | Gilliland et al. | 364/200 |
| 4,370,710 | 1/1983 | Kroft | 364/200 |
| 4,430,706 | 2/1984 | Sand | 364/200 |
| 4,437,827 | 3/1984 | Wilkes | 364/200 |
| 4,819,203 | 4/1989 | Shiroyanagi et al. | 364/900 |
| 4,875,160 | 10/1989 | Brown, III | 364/200 |
| 4,888,689 | 12/1989 | Taylor et al. | 364/200 |
| 4,905,141 | 2/1990 | Brenza | 364/200 |
| 4,926,323 | 5/1990 | Baror et al. | 364/200 |
| 5,034,885 | 7/1991 | Matoba et al. | 364/200 |
| 5,038,278 | 8/1991 | Steely, Jr. et al. | 364/200 |
| 5,119,483 | 6/1992 | Madden et al. | 395/375 |
| 5,146,569 | 9/1992 | Yamaguchi et al. | 395/375 |
| 5,150,469 | 9/1992 | Jouppi | 395/375 |

FOREIGN PATENT DOCUMENTS

0176972A2  9/1985  European Pat. Off. .

*Primary Examiner*—Dale M. Shaw
*Assistant Examiner*—Christopher B. Shin
*Attorney, Agent, or Firm*—Blakely Sokoloff Taylor & Zafman

[57] ABSTRACT

An apparatus and method are disclosed for switching the context of state elements of a very fast processor within a clock cycle when a cache miss occurs. To date, processors either stay idle or execute instructions out of order when they encounter cache misses. As the speed of processors become faster, the penalty for a cache miss is heavier. Having multiple copies of state elements on the processor and coupling them to a multiplexer permits the processor to save the context of the current instructions and resume executing new instructions within one clock cycle. The invention disclosed is particularly useful for minimizing the average instruction cycle time for a processor with a main memory access time exceeding 15 processor clock cycles. It is understood that the number of processes who's states are duplicated may easily be a large number n.

13 Claims, 4 Drawing Sheets

METHOD AND APPARATUS FOR RAPIDLY SWITCHING PROCESSES IN A COMPUTER SYSTEM

This is a continuation of application Ser. No. 07,389,570 filed Aug. 3, 1989.

BACKGROUND OF THE INVENTION

1. Field of the Invention

The present invention relates to method and apparatus for managing the memory in a computer. More specifically, the present invention relates to method and apparatus for switching the context of state elements in a very fast processor whenever there is a cache miss.

2. Art Background

It is quite common for a fast central processor unit to have a cache memory in addition to a main computer memory. The cache memory, typically smaller but much faster than the main computer memory, is placed between the the processor and the main memory. During the execution of a software program, the cache memory stores the most frequently utilized instructions and data. Whenever the processor needs to access information from memory, the processor examines the cache first before accessing the main computer memory. A cache miss occurs if the processor cannot find the instruction or data in the cache memory and is required to access the slower main memory. Thus, the cache memory reduces the average memory access time of a processor.

An instruction stream is a sequence of instructions executed by the processor to accomplish a given process, such as add or divide. To date, a processor does either one of the following two things when it encounters a cache miss in an instruction stream: (1) it stays idle until the instruction or data access to the main memory completes, or (2) it executes other instructions in the stream out of order. These two approaches are acceptable as long as they produce no substantial increase in the physical size (real estate) of the processor, and the penalty for cache misses does not overwhelm the average instruction cycle of the processor. Cache memory is typically 32K to 1M byte in size, and hence does not occupy significant space on a processor chip or a processor board.

However, the faster the processors become, the heavier the penalty for cache misses. The penalty for cache misses refers to the length of time a processor takes to retrieve needed information from the main memory upon occurrence of a cache miss. In a typical 40 MHz microprocessor capable of executing 40 million instructions per second (MIPS), the penalty for every cache miss is twenty (20) clock cycles. Assuming a 1% cache miss rate for the cache memory and further assuming one clock cycle per instruction for the very fast processor, the average number of clock cycles per instruction of these processors would only be 0.01 (20)+0.99 (1)=1.19 instead of 1.0 because of cache miss penalty. As such, the processors merely deliver 40/1.19=33.6 MIPS.

It is quite common to pipeline the instruction and memory operations of fast processors. A pipeline refers to a processor's ability to perform multiple tasks concurrently in the same clock cycle. Just as cache misses slow down the raw processing speed of fast processors, they also create bottlenecks in the pipelines of the processors.

The adverse effects of the cache miss penalty and pipeline bottlenecks on the speed of very fast processors render secondary the previous concern of minimizing the physical size of a processor. The trade-off is inevitable in view of the dramatic increase in speed of processors and the popularity of pipeline processing.

As will be described more fully below, the present invention provides method and apparatus for switching the context of state elements in a very fast processor upon occurrence of a cache miss. The present invention saves the state of a first process upon a cache miss and permits the processor to begin executing a second process within one clock cycle. Should the second process encounters another cache miss, the processor may return within one clock cycle to finish executing the first process if the necessary data had been retrieved from the main memory. Otherwise, the processor may begin executing a third process. It is understood that the number of processes whose states are duplicated may easily be a large number n.

SUMMARY OF THE INVENTION

An apparatus and method are disclosed for switching the context of state elements of a very fast processor within a clock cycle when a cache miss occurs. To date, processors either stay idle or execute instructions out of order when they encounter cache misses. As the speed of processors become faster, the penalty for a cache miss is heavier. Having multiple copies of state elements on the processor and coupling them to a multiplexer permits the processor to save the context of the current instructions and resume executing new instructions within one clock cycle. The invention disclosed is particularly useful for minimizing the average instruction cycle time for very fast processor with a main memory access time exceeding 15 processor clock cycles.

BRIEF DESCRIPTION OF THE DRAWINGS

The objects, features and advantages of the method and apparatus of the present invention will be apparent from the following detailed description of the invention in which:

FIG. 1 B illustrates a conceptual block diagram of the state elements and stateless elements of a processor.

DETAILED DESCRIPTION OF THE INVENTION

An apparatus and method for switching the context of state elements in a very fast processor upon occurrence of a cache miss is disclosed. In the following description, for purposes of explanation, specific devices, signals, and data structures are disclosed in order to more thoroughly understand the present invention. However, it will be apparent to one skilled in the art that the present invention may be practiced without these specific details. In other instances, well known circuits, devices, and data structures are not disclosed herein to avoid obscuring the present invention unnecessarily.

Figures 1A, 1B:
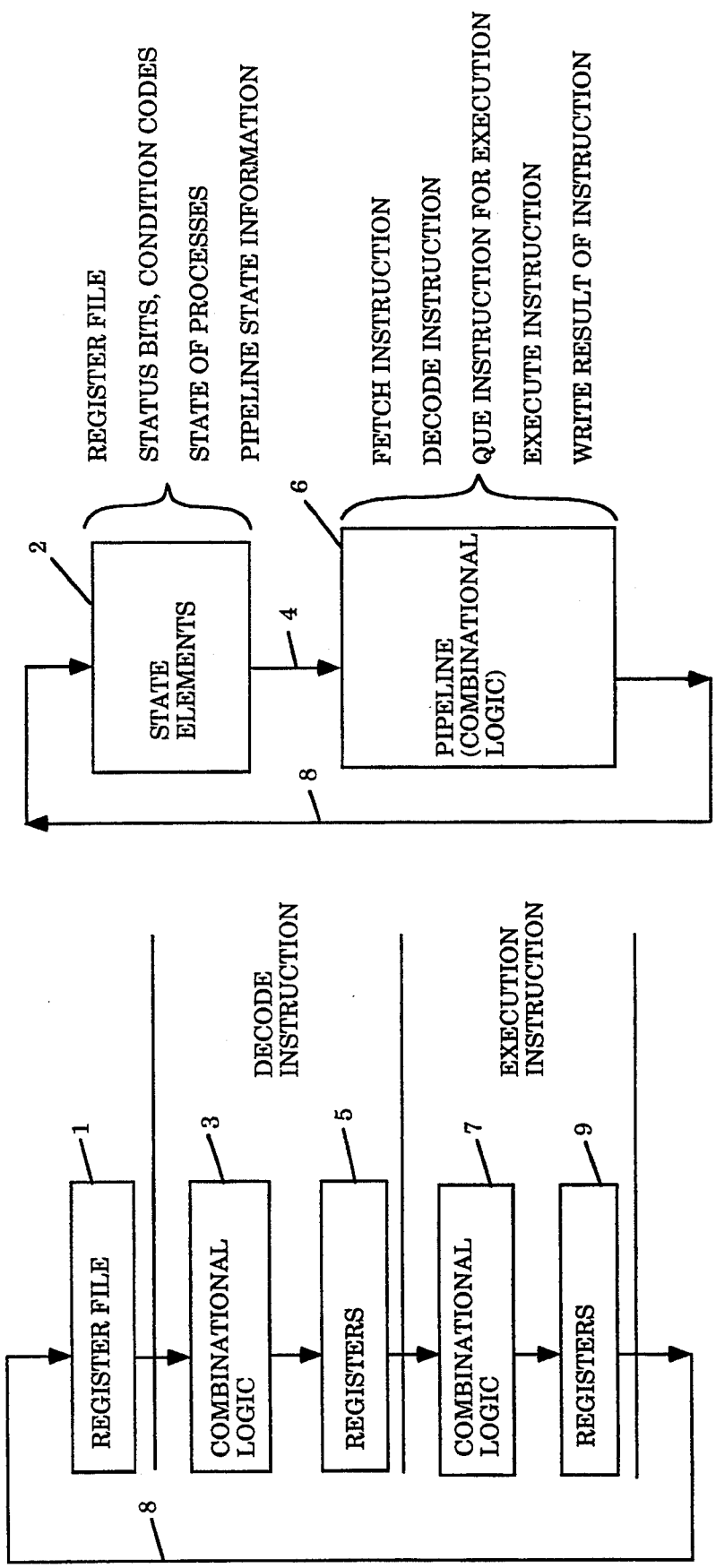
FIG. 1 A illustrates a conceptual block diagram of a processor.

FIG. 1A is a conceptual block diagram of a processor. A register file 1 is coupled to a combinational logic circuit 3 and registers 5. The combinational logic circuit 3 and the registers 5 are responsible for decoding instruction from the register file 1. Next, the decoded instructions are transferred to combinational logic circuit 7 and registers 9 for execution. Thereafter, the results of executed instructions are written on an communication or instruction bus 8.

FIG. 1B is a conceptual block diagram of the state elements and stateless elements of a processor. State elements 2 are coupled to a pipeline 6 over an instruction bus 4. By state elements, the present invention refers to flip-flops and registers on the the processor chip which store binary information indicative of the state of a particular process or processes. Such state elements typically comprise of register files, status bits, condition codes, and pre-fetched instructions. On the other hand, the pipeline 6 is stateless, i.e. does not store information indicative of the state of process that needs to be preserved during execution of a process. Most fast processors have at least a five-stage pipeline: they include fetch instruction, decode instruction, queue instruction for execution, execute instruction, and write result of instruction. For further reference, please see Mano, M. Morris, *Computer System Architecture*, (Prentice-Hall: 2nd. ed.), Chapter 22.

Figure 2:
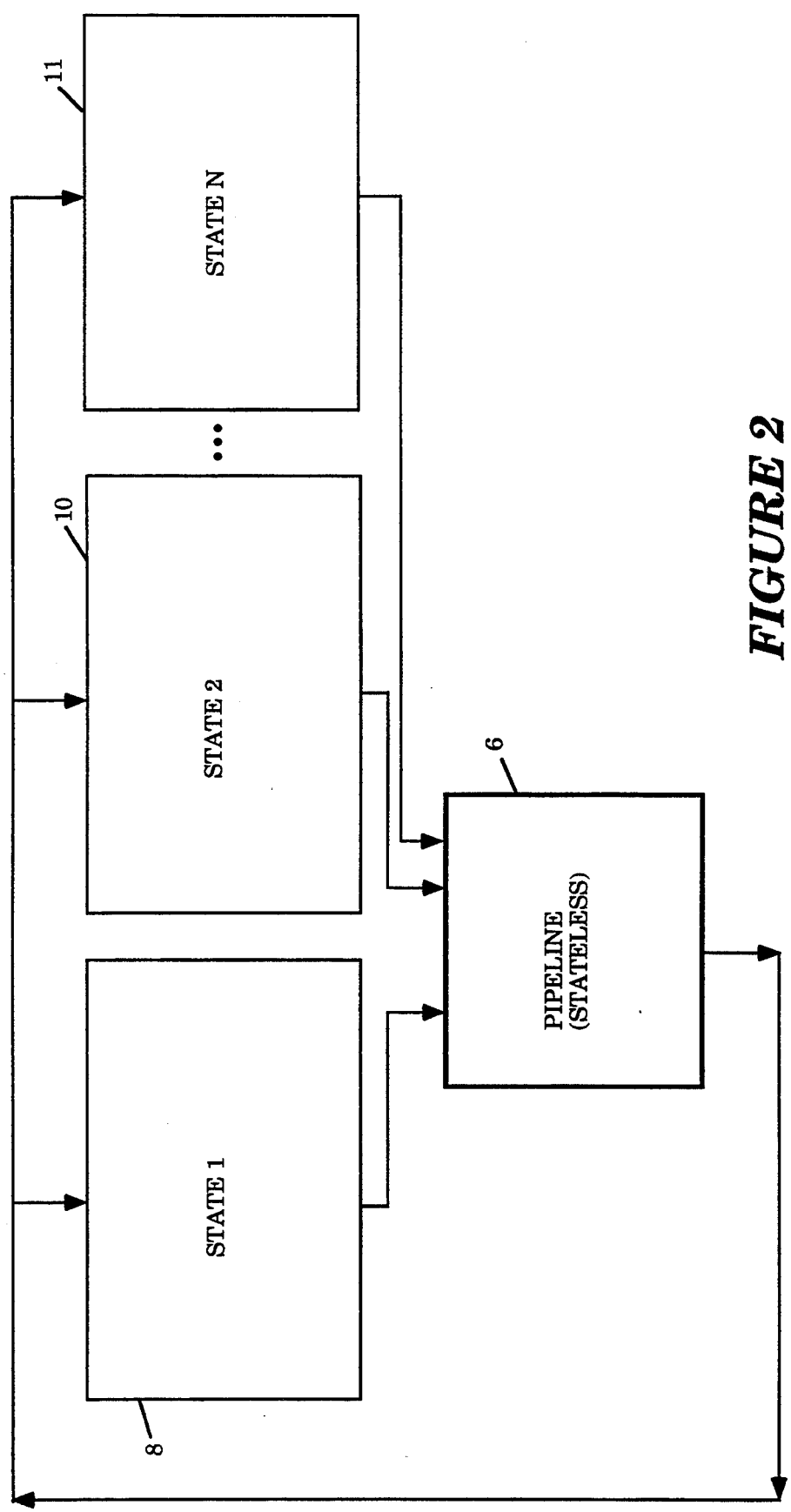
FIG. 2 illustrates a block diagram of the state of multiple N processes.

FIG. 2 illustrates a typical block diagram of the state of two processes feeding the pipeline 6. It will be appreciated that a plurality of n processes can feed one pipeline, and the processes can feed each other. It is an objective of the present invention to maximize the speed of the processor by utilizing the pipeline to the fullest extent. As such, when a cache miss occurs, the pipeline shall switch from one process to another. In the present example, if the pipeline 6 is executing process 8 when a cache miss occurs, the pipeline 6 is switched within one clock cycle to execute process 10 while saving the contents or states of process 8. Should process 10 encounters a cache miss before the process 8 retrieves the necessary data from the main memory, the pipeline 6 switches within one clock cycle to another process. Through this construction, the context of a plurality of processes 11 may be saved.

FIG. 3 (a) shows a detailed description of the various state elements of a processor 13. A pre-fetched queue 12 pre-fetches and decodes instructions from memory. For simple instructions, pre-fetched queue transmits execution microinstructions to an execution unit 14 over a microinstruction bus 16. For more complex instructions, the pre-fetched queue 12 starts the microprogram flow by sending signals to a microprogram sequencer 18 over the bus 16. An address translation unit 22 implements efficient on-chip memory management by performing virtual to physical address translation for all memory translation. When a cache miss occurs, the pre-fetched queue 12 sends a microinstruction to the address translation unit 22 over the bus 16 to fetch the address of the next process from memory. Finally, a bus control logic 26 manages the bus protocol and recognizes events such as interrupts and initialization.

Figures 3A, 3B:
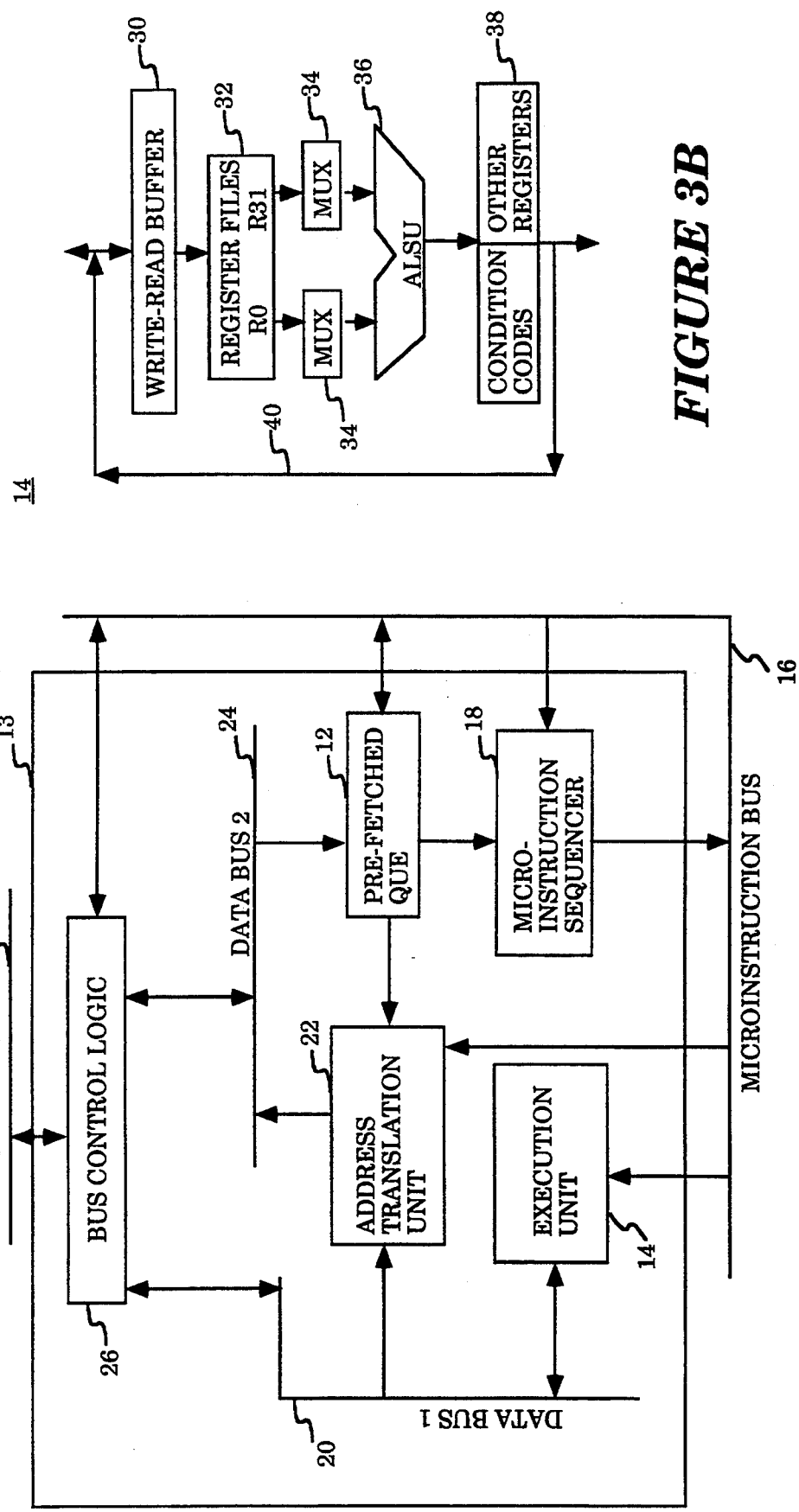
FIGS. 3(a) and 3(b) illustrate a detailed description of the state elements of a very fast processor.

FIG. 3(b) is a detailed sketch of a typical execution unit of a very fast processor. A write-read buffer 30 is coupled to a register file 32. An arithmetic logic shift unit (ALSU) 36 is further coupled to the register file 32 over a plurality of multiplexers 34. The output of (ALSU) 36 is registered with condition codes and other registers 38 before it is transmitted on a result bus 40.

Figure 4:
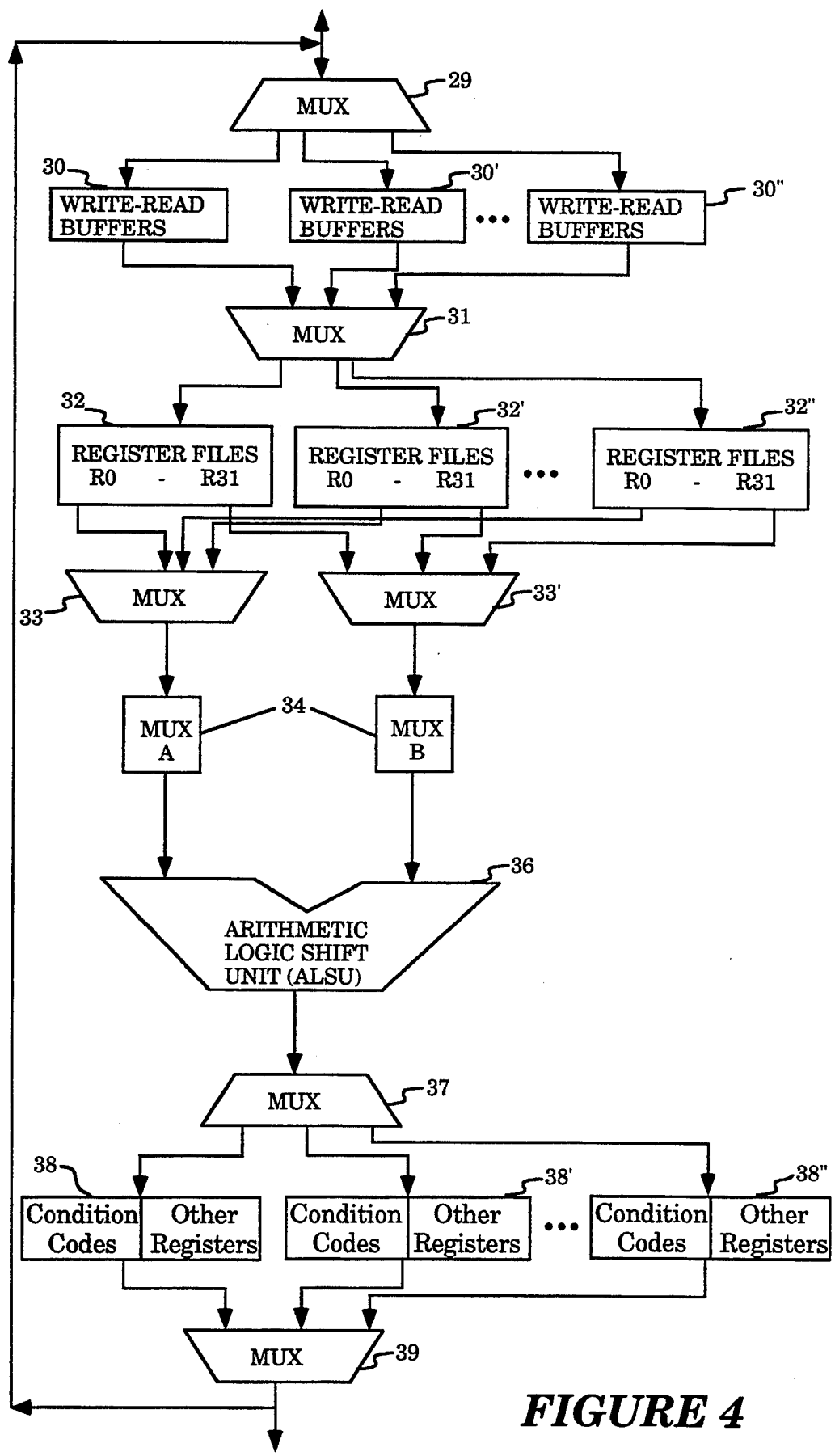
FIG. 4 illustrates an execution unit of a very fast processor utilizing the teachings of the present invention.

According to the principles of the present invention, state flip-flops of each of the state elements of a processor are duplicated. A multiplexer is coupled to all the duplicate flip-flops. As such, FIG. 4 shows the present invention as applied to the execution unit 14 of the processor 13. A multiplexer 29 is coupled to a plurality of write-read buffer 30—30". The plurality of write-read buffer are in turn coupled to a plurality of register files 32—32" over a multiplexer 31. Before data flows from the plurality of register files 32—32" to the ALSU 36, they are channeled over multiplexers 33, 33", and 34. The ALSU 36 is again coupled to a multiplexer 37 before the data are stored in a plurality of condition codes and other registers 38—38". Note that the multiplexers in front of the plurality of state flip-flops function to preserve the context of a first process upon occurrence of a cache miss. Within one clock cycle, the pipeline can execute another process without additional idling or delay. Should the second process encounters another cache miss, the processor may return within one clock cycle to finish executing the first process if the necessary data had been retrieved from the main memory. Otherwise, the processor may begin executing a third process. It is understood that a plurality of n processes whose states are duplicated may easily be saved.

Applying the present invention to a typical processor that delivers 40 MIPS and assuming a 1% cache miss ratio and one clock cycle per instruction, the penalty for every cache miss shall be as low as one (1) clock cycle. The average number of clock cycles per instruction of the processor would be $0.01\ (2)\ +0.99(1)=1.01$. As such, the processor deliver $40/1.01=39.6$ MIPS. It follows that the present invention permits users to harness almost all the speed a fast processor can deliver.

The present invention is practical when the memory cycle time to the system exceeds 15 processor cycles. Although the present invention has been described with reference to FIGS. 1-4, it will be appreciated that the figures are for illustration only and that a variety of fast processors may be designed to incorporate the teachings of the present invention.

While the present invention has been described in conjunction with the preferred embodiment, it is evident that numerous alternatives, modifications, variations and uses will be apparent to those skilled in the art in light of the foregoing description. In particular, other switches may be used in lieu of multiplexers. Further, more than one multiplexer may be placed before a plurality of duplicate state elements.

What is claimed is:

1. In a computer system comprising a pipelined processor coupled to a memory subsystem having a cache memory and a main memory, a method for executing a plurality of processes, said method comprising the steps of:

executing a first process by a plurality of stateless elements of said pipelined processor, execution results and state information of said first process being stored by said stainless elements into a first plurality of state elements of said pipelined processor coupled to said stateless elements, said first process being an instance of a first program stored in said memory subsystem;

suspending execution of said first process by said stateless elements when encountering a first cache miss while executing said first process; and switching to execute a second process by said stateless elements upon suspending execution of said first process, execution results and state information of said second process being stored by said stateless elements into a second plurality of state elements of said pipelined processor coupled to said stateless elements, said second process being an instance of a second program Stored in said memory subsystem, said suspension and switching being accomplished in a first time period that is shorter than a second time period required on average by said memory subsystem to handle a cache miss.

2. The method as set forth in claim 1, wherein, said method further comprises the steps of:

suspending execution of said second process by said stateless elements when encountering a second cache miss while executing said second process; and switching back to execute said previously suspended first process by said stateless elements upon suspending said second process if data fetching from said main memory into said cache memory by said cache and main memory as a result of said first cache miss has been completed, said suspension of execution of said second process and switching back being accomplished in a third period that is also shorter than said second time period.

3. The method as set forth in claim 2, wherein, said method further comprises the step of switching to execute a third process by said stateless elements upon suspending execution of said second process if said data fetching from said main memory into said cache memory by said cache and main memory as a result of said first cache miss has not been completed, said execution results and state information of said third process being stored in a third plurality of state elements coupled to said stateless elements, Said third process being an instance of a third program stored in said memory subsystem, said suspension of execution of said second process and said switching to execute said third process being accomplished in a fourth time period that is also shorter than said second time period.

4. The method as set forth in claim 3, wherein, said suspension of execution of said first process and switching to execute said second process is accomplished by said stateless elements in $m_1$ clock cycle(s) where $m_1$ equals at least one;

said suspension of execution of said second process and switching back to execute said first process is accomplished by said stateless elements in $m_2$ dock cycle(s) where $m_2$ equals at least one;

said suspension of execution of said second process and switching to execute said third process is accomplished by said stateless elements in $m_3$ clock cycle(s) where $m_3$ equals at least one;

said data fetching from said main memory into said cache memory as a result of said first cache miss is accomplished by said cache and main memory in an average of n dock cycles where n is greater than $m_1$, $m_2$, and $m_3$.

5. The method as set forth in claim 4, wherein $m_1$ equals one, and $m_2$ and $m_3$ equals $m_1$; and n equals fifteen.

6. In a computer system comprising a memory subsystem having a cache memory and a main memory coupled to each other, an apparatus for executing a plurality of processes, said apparatus comprising:

a first plurality of state elements coupled to said memory subsystem for storing execution results and state information of a first process, said first process being an instance of a first program stored in said memory subsystem;

a second plurality of state elements coupled to said memory subsystem for storing execution results and state information of a second process, said second process being an instance of a second program stored in said memory subsystem; and a plurality of stateless elements coupled to said memory subsystem and said first and second plurality of state elements for executing said first process, suspending execution of said first process when encountering a first cache miss while executing said first process, and switching to execute said second process upon suspending execution of said first process, said stateless elements storing execution results and state information of said first and second processes in said first and second plurality of state elements respectively, said stateless elements accomplishing said suspension and switching in a first time period that is shorter than a second time period required on average by said memory subsystem to handle a cache miss.

7. The apparatus as set forth in claim 6, wherein, said stateless elements further suspends execution of said second process when encountering a second cache miss while executing said second process, and switching back to execute said first process upon suspending execution of said second process if data fetching from said main memory into said cache memory by said cache and main memory as a result of said first cache miss has been completed, said stateless elements accomplishing said suspension of execution of said second process and switching back in a third time period that is also shorter than said second time period.

8. The method as set forth in claim 7, wherein, said apparatus further comprises a third plurality of state elements coupled to said memory subsystem and said stateless elements for storing execution results and state information of a third process, said third process being an instance of a third program stored in said memory subsystem; and said stateless elements further switches to execute said third process upon suspending execution of said second process if said data fetching from said main memory into said cache memory by said cache and main memory as a result of said first cache miss has not been completed, said stateless elements accomplishing said suspension of execution of said second process and switching to execute said third process in a fourth time period that is also shorter than said second time period.

9. The apparatus as set forth in claim 8, wherein, said stateless elements suspend execution of said first process and switch to execute said second process in $m_1$ clock cycle(s) where $m_1$ equals at least one;

said stateless elements suspend execution of said second process and switch back to execute said first process in $m_2$ clock cycle(s) where $m_2$ equals at least one;

said stateless elements suspend execution of said second process and switch to execute said third process in $m_3$ dock cycle(s) where $m_3$ equals at least one; and said cache and main memory perform said data fetching from said main memory into said cache memory as a result of said first cache miss in an average of n clock cycles where n is greater than $m_1$, $m_2$, and $m_3$.

10. The apparatus as set forth in claim 9, wherein, $m_1$ equals one, and $m_2$ and $m_3$ equals $m_1$; and n equals fifteen.

11. A computer system comprising:

a pipelined processor comprising a plurality of stateless elements, and a first and second plurality of state elements coupled to said stateless elements for executing one of a first and a second process, said stateless elements first executing said first process, then suspending execution of said first process when encountering a first cache miss while executing said first process, and switching to execute said second process upon suspending execution of said first process, said stateless elements storing execution results and state information of said first and second processes in said first and second plurality of state elements respectively; and a memory subsystem coupled to said pipelined processor having a cache memory and a main memory for storing a first and a second program, said first and second processes being instances of said first and second programs respectively, said stateless elements accomplishing said suspension anal switching in a first time period that is shorter than a second time period required on average by said memory subsystem to handle a cache miss.

12. The computer system as set forth in claim 11, wherein, said stateless elements further suspend execution of said second process when encountering a second cache miss while executing said second process, and switch back to execute said previously suspended first process upon suspending execution of said second process if data fetchings from said main memory into said cache memory by said cache and main memory as a result of said first cache miss has been completed, said stateless elements accomplishing said suspension of said second process and switching back in a third time period that is also shorter than said second time period.

13. The computer system as set forth in claim 12, wherein, said pipelined processor further comprises a third plurality of state elements coupled to said stateless elements and said memory subsystem for storing execution results and state information of a third process, said third process being an instance of a third program stored in said memory subsystem;

said stateless elements switch to execute said third process upon suspending execution of said second process if data fetchings from said main memory into said cache memory by said cache and main memory as a result of said first cache miss has not been completed, said stateless elements storing execution results and state information of said third process into said third plurality of state elements, said stateless elements accomplishing said suspension of said second process and switching to execute said third process in a fourth time period that is also shorter than said second time period.

* * * * *

UNITED STATES PATENT AND TRADEMARK OFFICE
CERTIFICATE OF CORRECTION

PATENT NO. : 5,361,337
DATED : November 1, 1994
INVENTOR(S) : Okin

It is certified that error appears in the above-identified patent and that said Letters Patent is hereby corrected as shown below:

In column 5, claim 3 at line 38, please delete " Said " and insert -- said --.

In column 6, claim 9 at line 65, please delete " dock " and insert -- clock --.

In column 7, claim 11 at line 26, please delete " anal " and insert -- and --.

Signed and Sealed this

Twentieth Day of October, 1998

*Attest:*

BRUCE LEHMAN

*Attesting Officer*   *Commissioner of Patents and Trademarks*

UNITED STATES PATENT AND TRADEMARK OFFICE
CERTIFICATE OF CORRECTION

PATENT NO. : 5,361,337
DATED : November 1, 1994
INVENTOR(S) : Okin

It is certified that error appears in the above-identified patent and that said Letters Patent is hereby corrected as shown below:

In column 4, line 60, delete "stainless elements" and insert -- stateless elements -- .

In column 5, line 8, delete "a second program Stored in said memory" and insert -- a second program stored in said memory-- .

In column 5, line 51, delete "dock cycle(s)" and insert -- clock cycle(s) -- .

In column 5, line 60, delete "dock cycles" and insert -- clock cycles -- .

Signed and Sealed this

Sixth Day of February, 2001

Attest:

Q. TODD DICKINSON

*Attesting Officer*                *Director of Patents and Trademarks*